US009539668B2

(12) United States Patent
Vindler et al.

(10) Patent No.: US 9,539,668 B2
(45) Date of Patent: Jan. 10, 2017

(54) LASER CLEANING SYSTEM FOR A STATOR SLOT

(71) Applicants: Michael R. Vindler, Pittsburgh, PA (US); James A. Bauer, Gibsonia, PA (US)

(72) Inventors: Michael R. Vindler, Pittsburgh, PA (US); James A. Bauer, Gibsonia, PA (US)

(73) Assignee: Siemens Energy, Inc., Orlando, FL (US)

( * ) Notice: Subject to any disclaimer, the term of this patent is extended or adjusted under 35 U.S.C. 154(b) by 890 days.

(21) Appl. No.: 13/738,068

(22) Filed: Jan. 10, 2013

(65) Prior Publication Data

US 2014/0190948 A1    Jul. 10, 2014

(51) Int. Cl.
*B23K 26/00* (2014.01)
*B23K 26/38* (2014.01)
*B08B 7/00* (2006.01)

(52) U.S. Cl.
CPC ............. *B23K 26/38* (2013.01); *B08B 7/0042* (2013.01)

(58) Field of Classification Search
CPC .............................. B08B 7/0042; B23K 26/38
USPC ........................ 219/121.78–121.8, 121.85,219/121.63–121.72; 264/400; 310/215
See application file for complete search history.

(56) References Cited

U.S. PATENT DOCUMENTS

| 4,900,891 | A  | 2/1990 | Vega et al. |
| 2002/0134770 | A1 | 9/2002 | Freiwald |
| 2004/0074883 | A1 | 4/2004 | Kilburn |

FOREIGN PATENT DOCUMENTS

DE    4021407 A1    10/1991

*Primary Examiner* — Dana Ross
*Assistant Examiner* — Lindsey C Staubach

(57) ABSTRACT

A device for removing a coating formed in a slot of a stator core. The device includes a carriage movably attached to a first guide rail assembly to enable movement of the carriage in a longitudinal direction. The device also includes a first drive screw wherein rotation of the first drive screw moves the first guide rail assembly in the longitudinal direction. In addition, the device includes a second guide rail assembly that is attached to the carriage wherein the second guide rail assembly enables movement of the carriage in a direction transverse to the longitudinal direction. Further, the device includes a second drive screw wherein rotation of the second drive screw moves the carriage in the transverse direction. The carriage includes a laser beam emitting head that moves within the slot in either or both the longitudinal or transverse directions wherein the laser beam emitting head emits a laser beam to remove the coating.

18 Claims, 8 Drawing Sheets

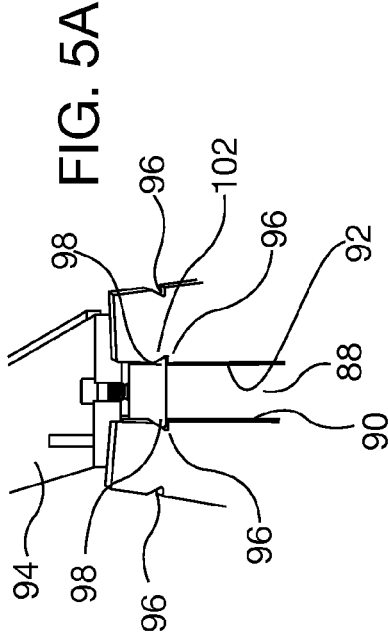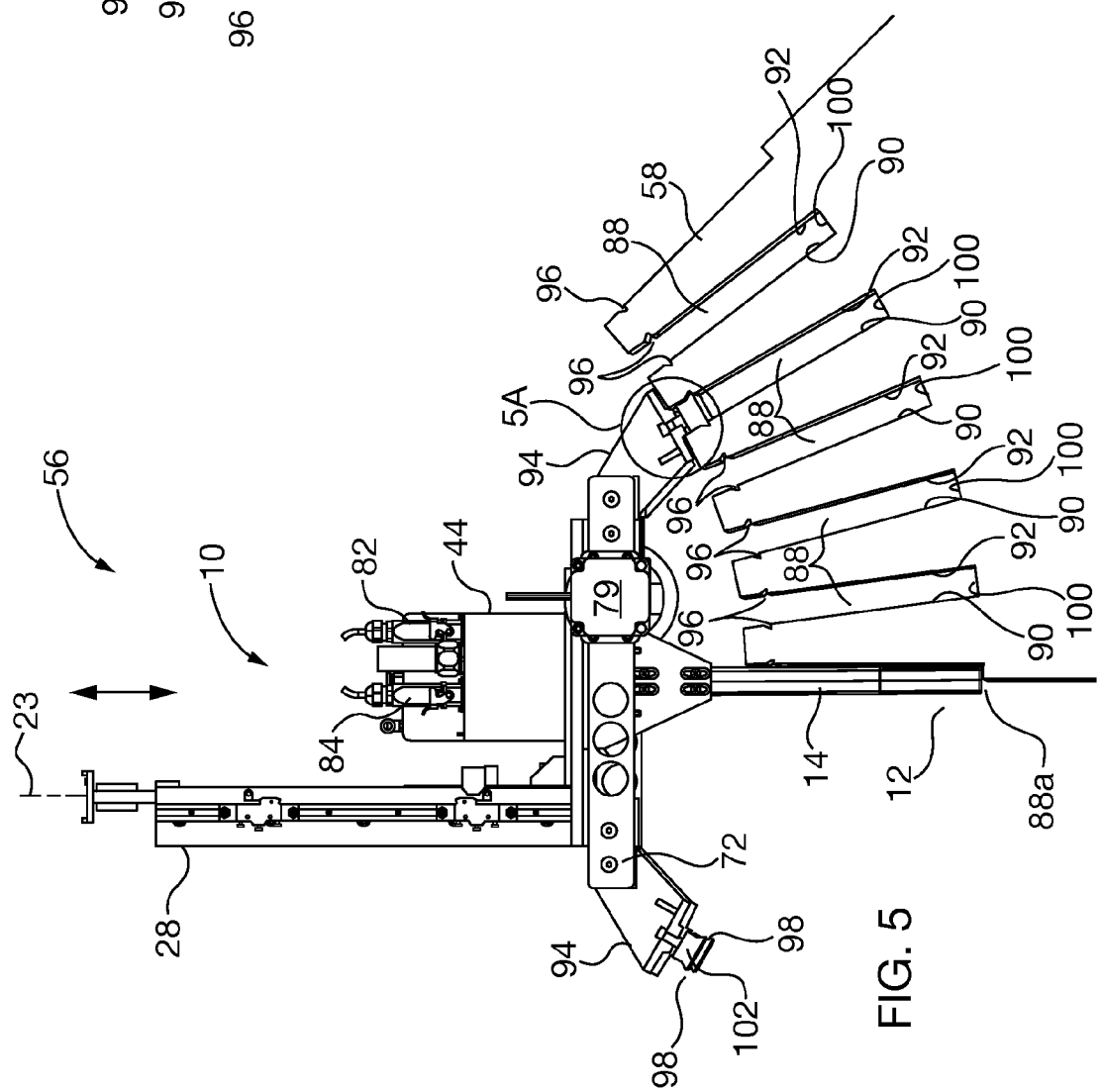

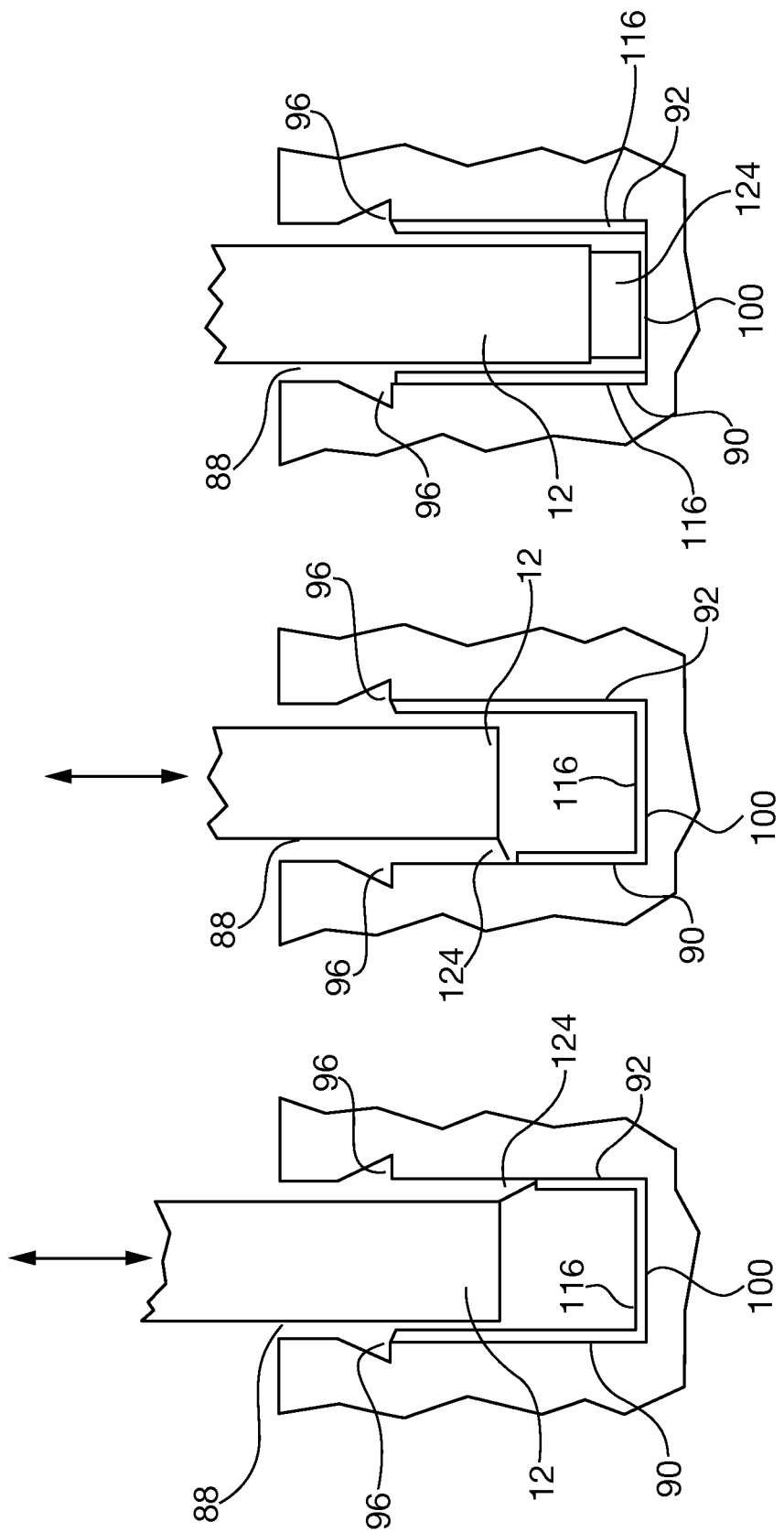

LASER CLEANING SYSTEM FOR A STATOR SLOT

CROSS REFERENCE TO RELATED APPLICATION

The disclosure of copending patent application Ser. No. 13/738,032 entitled MEDIA BLASTING CARRIAGE FOR A STATOR SLOT, first named inventor Michael R. Vindler, is hereby incorporated by reference in its entirety.

FIELD OF THE INVENTION

This invention relates to electric generators, and more particularly, to a device that utilizes a rail system and a carriage to provide a moveable laser beam emitting head that emits a laser beam to remove a coating formed in a slot of a stator core.

BACKGROUND OF THE INVENTION

Electric generators used for electric power generation include a rotor and a stator having a stator core. The stator core is fabricated from thin laminations and includes a plurality of stator slots each adapted to receive an associated electrical winding formed as a coil. Each coil is retained within its corresponding slot by a wedge device for providing a tight fit so that movement of the coil relative to the stator core is minimized. A global vacuum pressure impregnation (GVPI) process is then used to impregnate the entire stator with an epoxy based resin coating. Such coatings serve to bond the coils to the stator to further minimize relative movement of the coils while also providing electrical insulation, corrosion resistance and other benefits.

A significant number of electric generators currently in use have been manufactured using the GVPI process and have been in operation for several years. However, it has been found that the coating breaks down and erodes over time thus requiring that the stator be repaired. An option for repairing the stator is to perform a field rewind of the stator at a customer location. During a field rewind, the wedges and stator coils are removed but a significant portion of the original coating remains. Prior to the installation of replacement coils and wedges, the remaining coating must be removed from the stator slots in order to obtain proper coil fitment and electrical contact between the new coils and the stator core. The remaining coating is approximately 0.020 inches thick and is comprised of layers of resin and mica insulation and is difficult to remove from the slots.

A method used to remove coating from the stator slots is to manually remove the coating using hand held brass scrapers. However, this process is inefficient, labor intensive, and may damage the stator core iron if performed incorrectly.

Another method utilizes high pressure water to remove the coating from the slots. However, it has been found that high pressure water undesirably penetrates between the core laminations and results in the removal of insulation between the laminations. This causes undesirable electrical shorts between individual laminations. Further, the water oxidizes the iron in the stator core and causes rust on the laminations.

SUMMARY OF THE INVENTION

A device for removing a coating located in a slot of a stator core of an electric generator is disclosed. The device includes a first guide rail assembly removably attached to the stator core and a carriage movably attached to the first guide rail assembly to enable movement of the carriage in a longitudinal direction relative to the stator core. The device also includes a first drive screw wherein rotation of the first drive screw moves the first guide rail assembly in the longitudinal direction. In addition, the device includes a second guide rail assembly that is moveably attached to the carriage, wherein the second guide rail assembly enables movement of the carriage in a direction transverse to the longitudinal direction. Further, the device includes a second drive screw wherein rotation of the second drive screw moves the carriage in the transverse direction. A laser beam emitting head is attached to the carriage wherein the laser beam emitting head moves within the slot in either the longitudinal or transverse directions or both the longitudinal and transverse directions wherein the laser beam emitting head emits a laser beam to remove the coating.

BRIEF DESCRIPTION OF THE DRAWINGS

FIG. 5 is an end view of the laser cleaning system and a stator core shown as a partial view.

FIG. 5A is an enlarged view of balloon section 5A of FIG. 5 and depicts flanges of an attachment block inserted in grooves of a stator slot.

FIGS. 8A-8C depict end views of a laser beam emitting head located in a stator slot.

DESCRIPTION OF THE INVENTION

Figure 1:
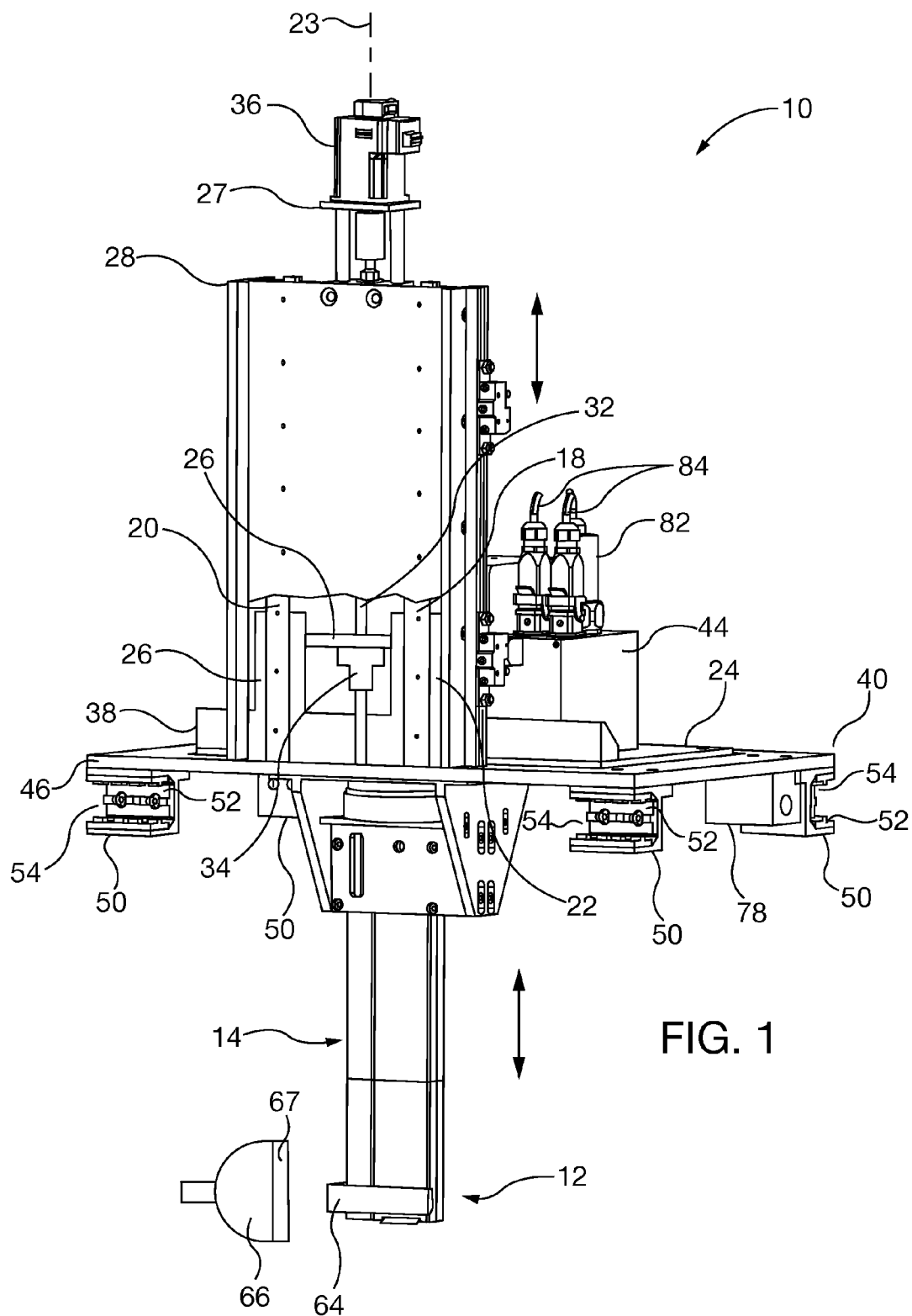
FIG. 1 is a front view of a carriage assembly for a laser cleaning system in accordance with the present invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings. In the description below, like reference numerals and labels are used to describe the same, similar or corresponding parts in the several views of FIGS. 1-8C.

During a field rewind, the wedges and stator coils are removed but a significant portion of the original coating remains. Prior to the installation of replacement coils and wedges, the remaining coating must be removed from the stator slots in order to obtain proper coil fitment and electrical contact between the new coils and the stator core. The remaining coating is approximately 0.020 inches thick and is comprised of layers of resin and mica insulation and is difficult to remove from the slots.

Figure 2:
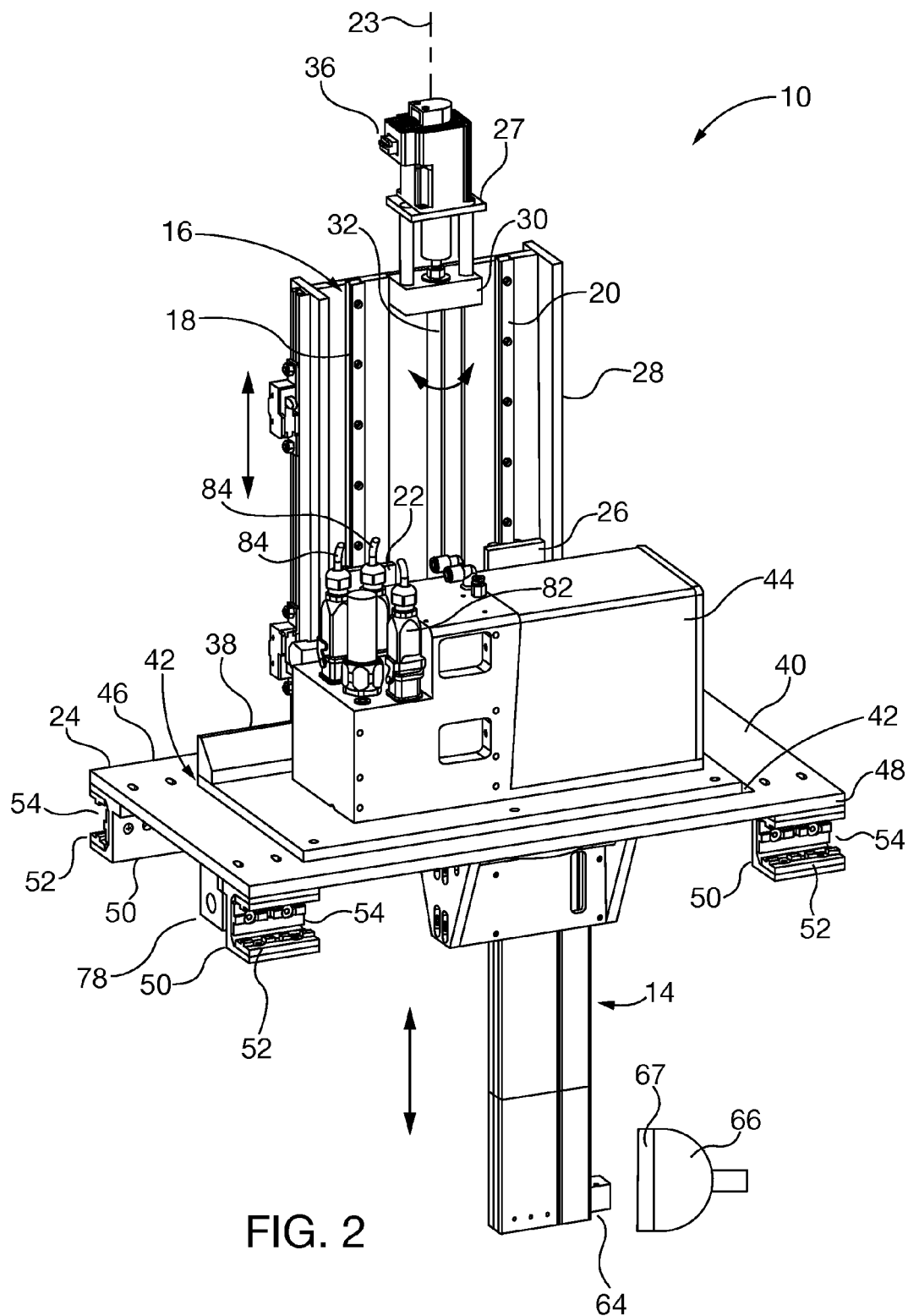
FIG. 2 is a rear view of the carriage assembly.

Referring to FIGS. 1 and 2, front and rear views, respectively, are shown of a carriage assembly 10 for a laser cleaning system 56 used to remove coating in slots 88 of a stator core 58 (see FIGS. 3 and 4) of an electric generator. The carriage assembly 10 includes a laser scanning head 44 having a downwardly extending optic assembly 14 that includes a laser beam emitting head 12. The laser scanning head 44 is connected by a fiber optic cable 82 and laser control cables 84 to a laser source 85. The laser scanning head 44 includes a scanning mirror and aperture lens for providing a suitable laser beam from the beam emitting head 12 for removing a coating from a generator core.

Figure 3:
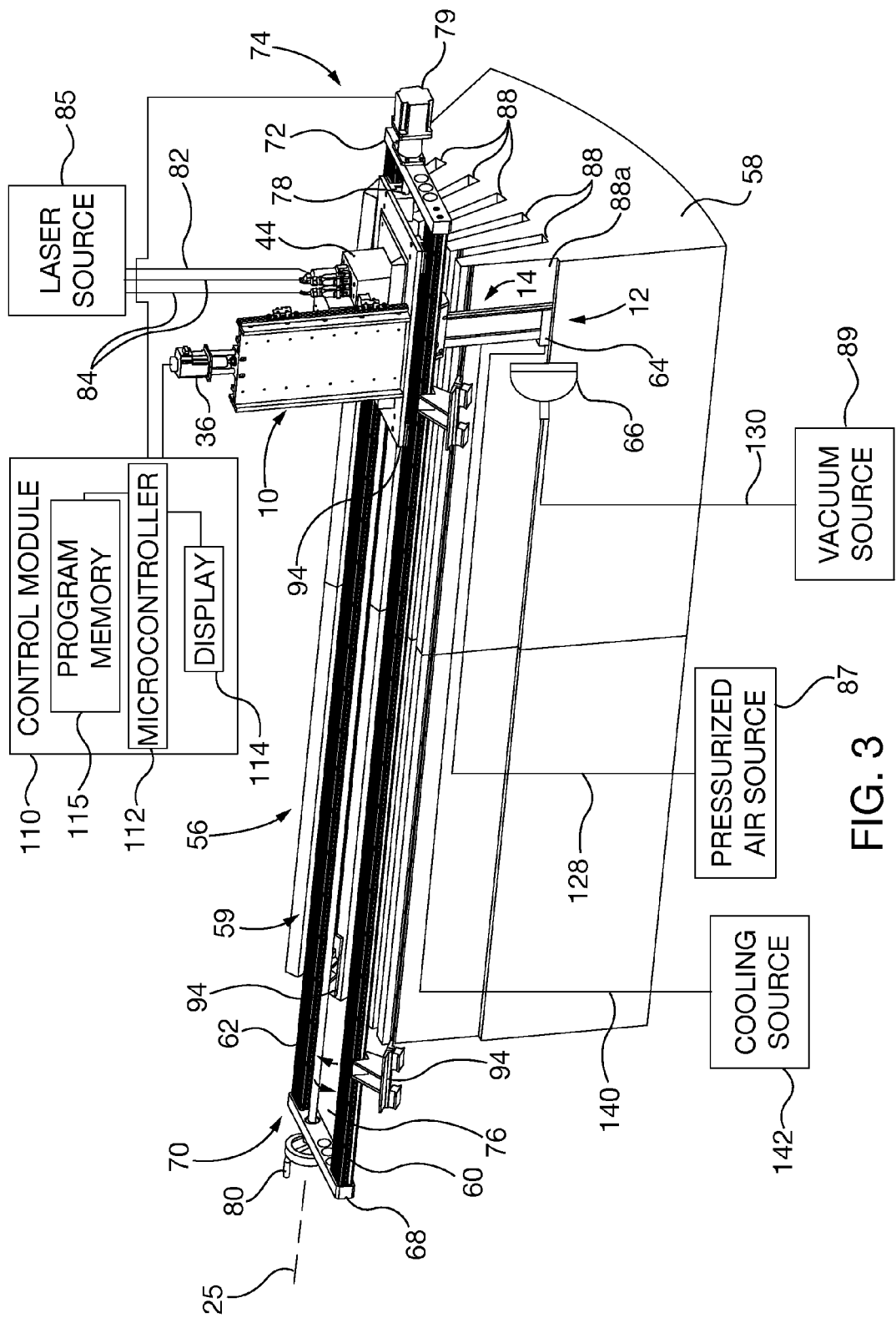
FIG. 3 is a perspective view of the laser cleaning system including the carriage assembly.

The carriage assembly 10 further includes a carriage 24 having a carriage frame portion 40 oriented along a longitudinal axis 25 of the laser cleaning system 56 (see FIG. 3). The longitudinal axis 25 corresponds to a longitudinal axis of the stator core 58. The carriage 24 also includes a carriage back plate portion 28 oriented along an axis 23 transverse to the longitudinal axis 25. The carriage back plate portion 28 includes a first rail assembly 16 having left 18 and right 20 first guide rails oriented along the transverse axis 23. The laser scanning head 44 is located on a guide frame 38 having left 22 and right 26 guides oriented along the transverse axis 23. The carriage frame portion 40 includes an aperture 42 for accommodating the guide frame 38 thus enabling movement of the guide frame 38 through the carriage frame portion 40. The left 18 and right 20 first guide rails extend through the left 22 and right 26 guides, respectively, to enable movement of the guide frame 38, and thus the beam emitting head 12, along the transverse axis 23 relative to the carriage back plate portion 28 and carriage frame portion 40.

A bottom cross member 26 is attached to the left 22 and right 26 guides. The carriage assembly 10 also includes a guide block 30 and a first bearing block 34 that is attached to the bottom cross member 26. A first drive screw 32 extends through the guide block 30 and is threadably engaged with the first bearing block 34. Rotation of the first drive screw 32 causes movement of the first rail assembly 16, and thus the beam emitting head 12, along the transverse axis 23. In particular, rotation of the first drive screw 32 in a first direction causes either upward or downward movement, for example, of the beam emitting head 12 along the transverse axis 23 whereas rotation of the first drive screw 32 in a second direction causes movement of the beam emitting head 12 in an opposite direction along the transverse axis 23. The first drive screw 32 is connected to a first electric motor 36 mounted on a top cross member 27 that rotates the first drive screw 32 in either the first or second directions. The first electric motor 36 may be a stepper motor and includes an encoder used for determining a transverse position, for example a vertical position along the transverse axis 23, of the beam emitting head 12 relative to a slot 88.

The optic assembly 14 further includes an air jet assembly 64 for providing a high pressure air stream for removing debris formed during removal of the coating. The carriage assembly 10 may also include a vacuum manifold 66 for vacuuming fumes and debris generated during removal of the coating. The vacuum manifold 66 includes a vacuum inlet 67 located adjacent the air jet assembly 64. In addition, the shape of the vacuum manifold 66 corresponds with the stator slot profile so as to minimize the amount of dust and debris that may bypass the vacuum manifold 66.

First 46 and second 48 longitudinal sides of the frame 40 each include a pair of substantially U-shaped channel members 50 each having a channel 54 for receiving an associated second guide rail as will be described. Each channel 54 may include a bearing surface 52 for facilitating movement along an associated second guide rail.

Figure 4:
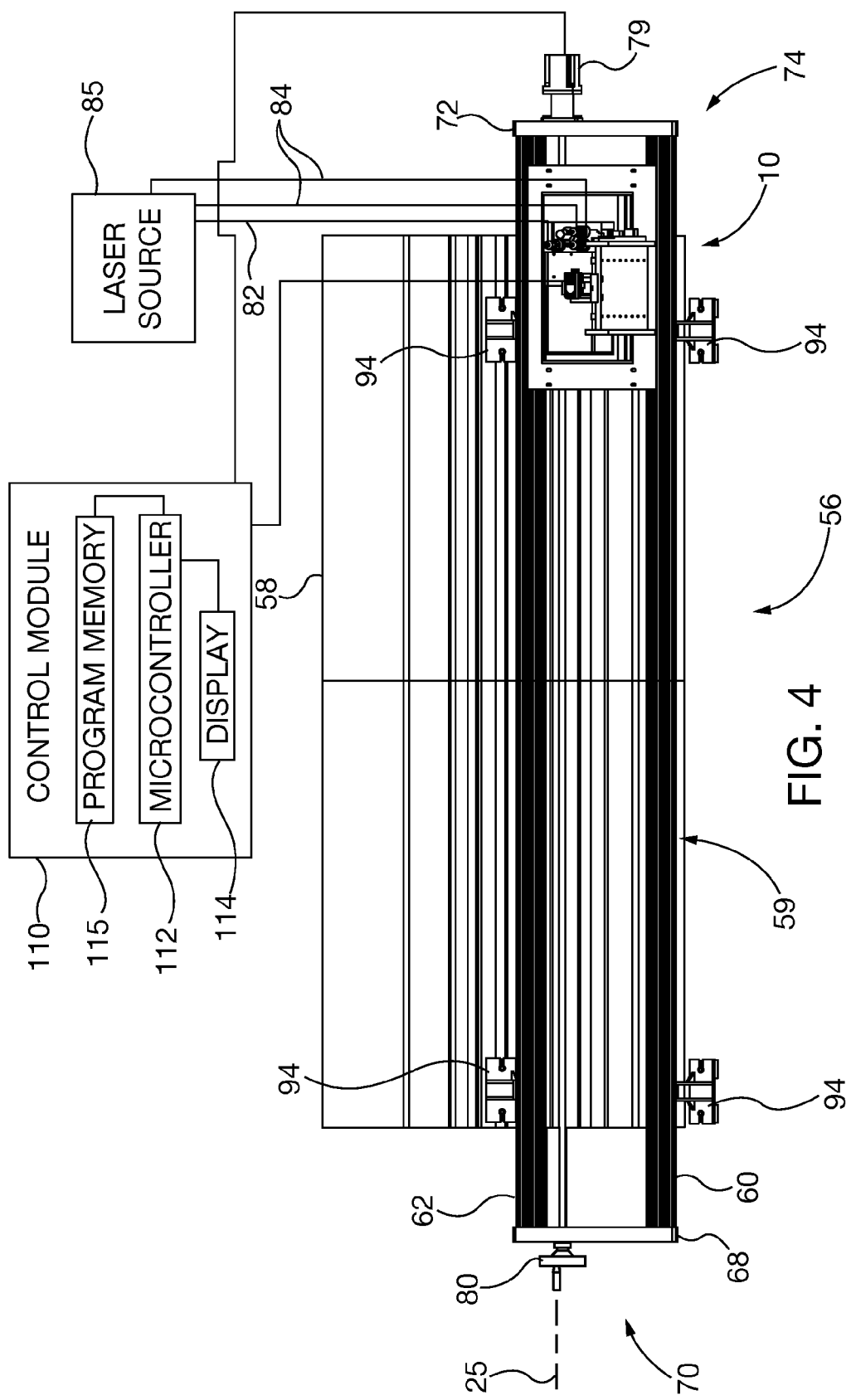
FIG. 4 is a top view of the laser cleaning system and carriage assembly.

Referring to FIGS. 3 and 4, perspective and top views of the laser cleaning system 56 positioned on a stator core 58 (depicted as a partial view) are shown. The laser cleaning system 56 further includes a second rail assembly 59, which is sized to enable the removal of coating from a section of the stator core 58. The second rail assembly 59 includes left 60 and right 62 second guide rails, which are oriented along the longitudinal axis 25 of the laser cleaning system 56. The longitudinal axis 25 corresponds to a longitudinal axis of the stator core 58. The left 60 and right 62 second rails are inserted in the channels 54 of the channel members 50 to enable movement of the carriage assembly 10 along the longitudinal axis 25 relative to the stator core 58. The left 60 and right 62 second rails are positioned between a front cross member 68 and rear cross member 72 located at front 70 and rear 74 ends, respectively, of the left 60 and right 62 second rails.

A second drive screw 76 is located between the left 60 and right 62 second rails and is threadably engaged with a second bearing block 78 located on the frame 40. Rotation of the second drive screw 76 causes movement of the carriage assembly 10 and thus beam emitting head 12 along the longitudinal axis 25 relative to the stator core 58. In particular, rotation of the second drive screw 76 in a first direction causes either forward or backward movement, for example, of the carriage assembly 10 and thus beam emitting head 12 along the longitudinal axis 25 whereas rotation of the second drive screw 76 in a second direction causes movement of the carriage assembly 10 and beam emitting head 12 in an opposite direction along the longitudinal axis 25. The second drive screw 76 is connected to a second electric motor 79, which may be a stepper motor, mounted on the rear cross member 72 that rotates the second drive screw 76 in either the first or second directions. The first 32 and second 79 electric motors rotate the first 32 and second 76 drive screws, respectively, such that the carriage assembly 10 and thus beam emitting head 12 move relative to the stator core 58 at a precise and controllable rate.

The laser source 85 may have a capacity of approximately 500 Watts and generates a pulsed laser beam having a frequency of approximately 25 KHz. The laser beam is transmitted via the fiber optic cable 82 to the laser scanning head 44. A scanning mirror in the laser scanning head 44 causes the laser beam to scan in a back and forth pattern at a frequency of approximately 130 Hz or other suitable frequency to generate a substantially line-shaped beam pattern. Signals for controlling motion of the scanning mirror are provided by the laser source 85 and transmitted to the laser scanning head 44 via the laser control cables 84. The laser source 85 may be a commercially available device such as that sold by Adapt Laser Systems LLC of Kansas City, Mo. A pressurized air source 87 provides high pressure air to the air jet assembly 64 so as to provide a stream of high pressure air for removing debris formed during removal of the coating. The vacuum manifold 66 is connected to a vacuum source 89 via vacuum line 130. The vacuum source 89 generates a vacuum sufficient for vacuuming fumes and debris generated during removal of the coating.

The laser cleaning system 56 is controlled by an operator via a control module 110 having a microcontroller 112 and program memory 115 which stores instructions for performing a cleaning procedure to remove a coating from a slot 88. The module 110 includes controls for adjusting the speed and direction of movement of the carriage assembly 10, and thus beam emitting head 12, along the transverse axis 23 and/or the longitudinal axis 25. In particular, the module 110 may include a control for moving the beam emitting head 12 along the transverse axis 23 and/or the longitudinal axis 25 in fixed increments or a control to enable minor adjustments in either direction. In addition, the module 110 includes a display 114 that provides readout indicative of a position of the beam emitting head 12 relative to a surface of a slot 88 being cleaned.

Referring to FIG. 5, an end view of the laser cleaning system 56 and stator core 58 (shown as a partial view) is depicted. The stator core 58 includes a plurality of slots 88 for receiving coils used to generate magnetic fields. Each slot 88 is defined by spaced apart left 90 and right 92 sidewalls and a bottom surface 100. Slot 88a is shown as a partial view and only depicts the right sidewall 92 and part of the bottom surface 100 for illustrative purposes. The left 60 and right 62 second rails include mounting feet 94, which are adapted to be removably attached to the stator core 58. Referring to FIG. 5A, an enlarged view of balloon section 5A of FIG. 5 is shown. The mounting feet 94 are attached to the stator core 58 using features substantially similar to that used to removably attach conventional wedges to the stator core 58. In one embodiment, the left 90 and right 92 sidewalls each include a groove 96 for accommodating corresponding flanges 98 that extend outwardly from an attachment block 102 located on each of the mounting feet 94. A fastener is then used to removably attach each of the mounting feet 94 to the stator core 58.

Figure 6:
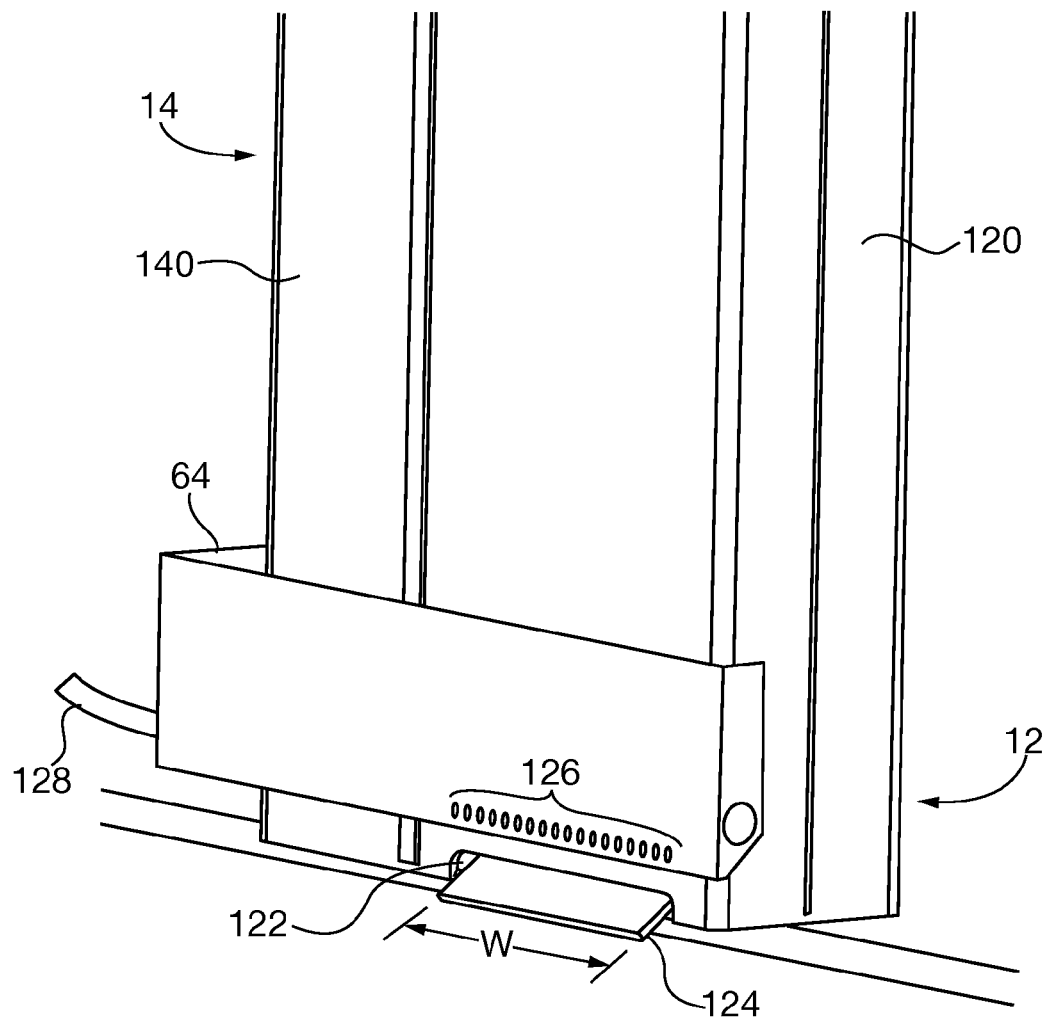
FIG. 6 is an enlarged view of a lower portion of an optic assembly including a laser beam emitting head.

Referring to FIG. 6, an enlarged view of a lower portion of the optic assembly 14 including the beam emitting head 12 is shown. The optic assembly 14 includes a housing 120 having a slot 122 through which a laser beam 124 for removing the coating is emitted. The scanning mirror in the laser scanning head 44 causes the laser beam 124 to scan in a substantially line shaped pattern that is oriented horizontally and has a width W of approximately 1.6 inches. The air jet assembly 64 includes a plurality of jet apertures 126 through which high pressure air streams are emitted for removing debris formed during removal of the coating. The air jet assembly 64 receives pressurized air from pressurized air source 87 via air supply line 128.

Figure 7:
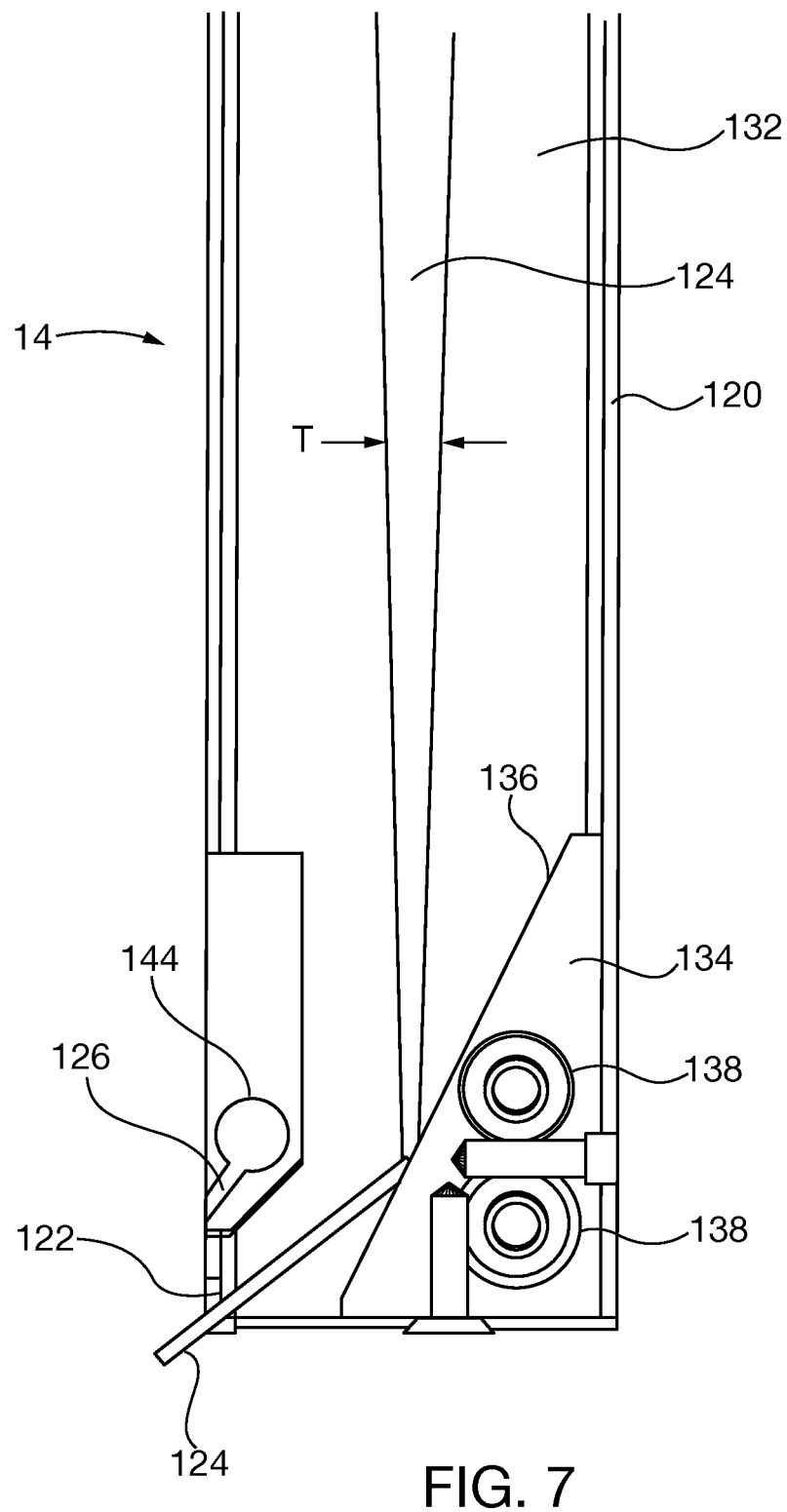
FIG. 7 is a cross sectional view of the optic assembly.

Referring to FIG. 7, a cross sectional view of the optic assembly 14 is shown which depicts laser beam 124. The housing 120 includes an interior light passageway 132 and a mirror 134 having an angled reflective surface 136. The scanning mirror in the laser scanning head 44 directs the laser beam 124 downward within passageway 132 and toward reflective surface 136. The reflective surface 136 is oriented at an angle suitable for deflecting a path of the laser beam 124 toward the slot 122 so that the laser beam 124 impinges on either the left 90 or right 92 sidewalls of a slot 88. Alternatively, the mirror 134 may be removed so that the laser beam 124 is not deflected and continues to travel downward so that the laser beam 124 impinges on the bottom surface 100 of a slot 88. A focal length of the optic assembly 14 is selected such that a thickness T of the laser beam 124 converges to a suitable focal point on either the left 90 or right 92 sidewalls or the bottom surface 100 of a slot 88. The mirror 134 may also include cooling tubes 138 which serve to cool the mirror 134 to maintain the mirror 134 at a suitable operating temperature. The cooling tubes 138 are connected to cooling lines 140 that are partially routed through a side housing 140 (see FIG. 6) and which are connected to a cooling source 142 (see FIG. 3). Further, each jet aperture 126 is in fluid communication with an air passageway 144 connected to the air supply line 128.

Alternate configurations of the beam emitting head 12 are used depending on the orientation of the slot surface to be cleaned. FIGS. 8A-8C depict end views of the beam emitting head 12 and a slot 88 having right 92 and left 90 sidewalls and bottom surface 100. During a field rewind, it is desirable to remove an insulation coating 116 from the right 92 and left 90 sidewalls and bottom surface 100. As previously described, the coating 116 is approximately 0.020 inches thick and is comprised of layers of resin and mica insulation. In order to remove the coating, the laser beam 124 is directed onto the coating 116. The laser beam 124 has sufficient energy to cause sublimation of the resin, resulting in delamination of the resin and thus disintegration of the coating 116. The disintegration of the coating 116 is further assisted by the high pressure air stream emitted from the jet apertures 126. Use of the laser beam 124 and jet apertures 126 results in the generation of fumes and debris that is collected by the vacuum manifold 66.

In FIG. 8A, a first configuration for the beam emitting head 12 is shown wherein the laser beam 124 impinges on the right sidewall 92 to remove the coating 116 on the right side wall 92. In order to the coating 116 from the left sidewall 90, a second configuration for the beam emitting head 12 is used wherein the laser beam 124 impinges on the left sidewall 90 as shown in FIG. 8B. In order to clean the bottom surface 100, the mirror 134 is removed from the beam emitting head 12 to form a third configuration wherein the laser beam 124 is not deflected by the mirror 134 and continues to travel downward so that the laser beam 124 impinges on the bottom surface 100 of the slot 88. In this configuration, the laser beam 124 is oriented by the scanning head 44 so that the width W of the laser beam 124 corresponds to a width of the slot 88.

Operation of laser scanning device 56 will now be described. By way of example, the beam emitting head 12 may be initially be arranged in accordance with the first configuration depicted in FIG. 8A wherein the laser beam 124 impinges on the right sidewall 92. During operation, the carriage assembly 10 is moved along the longitudinal axis 25 to a first position before the laser beam 124 is activated. The laser beam 124 is then activated and the carriage assembly 10 is moved along the transverse axis 23 so that the laser beam 124 removes a first strip of coating material in the transverse direction from the right sidewall 92. By way of example, the carriage assembly 10 is controlled to move at approximately 18 inches per minute, depending on the characteristics of the coating and other factors. The laser beam 124 is then deactivated and the carriage assembly 10 is incrementally moved along the longitudinal axis 25 to a second position. The laser beam 124 is again activated and a second strip of coating material in the transverse direction, adjacent to the first strip, is then removed from the right sidewall 92 by the laser beam 124. This process is then repeated until all of the coating 116 has been removed from the right sidewall 92.

The beam emitting head 12 may then be arranged in accordance with the second configuration depicted in FIG. 8B wherein the laser beam 124 impinges on the left sidewall 90. The process described in relation to the right sidewall 92 is then repeated for the left sidewall 90 until all of the coating 116 has been removed from the left sidewall 92. The beam emitting head 12 is then arranged in accordance with the third configuration depicted in FIG. 8C. In this configuration, the laser beam 124 is able to remove the coating 116 from the bottom surface 100 in a single strip.

After the coating has been removed from a section of the stator core 58, the laser cleaning system 56 may then be removed from the stator core 58 and re-attached to another section of the stator core 58 to continue removal of the coating from the stator core 58. In addition, two laser cleaning systems 56 may be used simultaneously to clean slots in the stator core 58. Operation of the laser cleaning system 56 may be automated by software to control movement of the beam emitting head 12 along the longitudinal 25 and transverse 23 axes.

In alternate embodiments, a single guide rail may be used instead of dual guide rails in a rail assembly. In addition, alternate drive mechanisms may be used to move the beam emitting head 12 such as drive mechanisms including pneumatic and/or hydraulic components, belt and pulley systems, gear systems and magnetic systems. Further, the current invention may also be used to remove coating from portions of the stator 58 other than a slot 88. In addition, the laser cleaning system 56 may be operated in alternate manner such that strips of coating material are first removed from a slot wall in a longitudinal direction. Further, the laser cleaning system 56 may be operated such that strips of coating material are removed from a slot wall in longitudinal and transverse directions simultaneously. In other embodiments, the beam emitting head 12 may be moved in diagonal, rotating, spiral, raster and other motions relative to a slot 88 in order to remove the coating 116.

While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations.

What is claimed is:

1. A device for removing a coating located on a slot of a stator core of an electric generator wherein the slot includes a bottom surface and first and second sidewalk that extend from the bottom surface and wherein the first and second sidewalls each terminate at a respective top surface, comprising:
   a laser beam emitting head, emitting a laser beam for removing stator core coating and wherein the laser beam emitting head includes a reflective surface;
   a first transport system for moving the laser beam emitting head in a first direction relative to the slot, wherein the first direction is transverse to a longitudinal axis of the stator core and wherein the first transport system includes first guide rails to enable movement of the first transport system in the first direction;
   a second transport system for moving the laser beam emitting head in a second direction relative to the slot, wherein the second direction is along the longitudinal axis;
   wherein at least one or both of the transport systems move the laser beam emitting head within the slot in at least one of the directions or both directions and wherein the reflective surface orients the laser beam away from the first direction and toward at least one sidewall to enable removal of coating between the top and bottom surfaces of the at least one sidewall.

2. The device according to claim 1 wherein the laser beam emitting head includes a mirror for directing the laser beam toward the coating.

3. The device according to claim 1 wherein the first transport system includes a first electric motor and a first drive screw for moving the laser beam emitting head in the first direction.

4. The device according to claim 1 wherein the second transport system includes second guide rails.

5. The device according to claim 1 wherein the second transport system includes a second electric motor and a second drive screw for moving the laser beam emitting head in the second direction.

6. The device according to claim 1 wherein the laser beam removes the coating by sublimation.

7. The device according to claim 1 wherein the laser beam emitting head moves at a rate of approximately 18 inches per minute.

8. A device for removing a coating located in a slot of a stator core of an electric generator wherein the slot includes a bottom surface and first and second sidewalls that extend from the bottom surface and wherein the first and second sidewalls each terminate at a respective top surface, comprising:
   a first transport system for moving a carriage in a first direction relative to the slot, wherein the first direction is transverse to a longitudinal axis of the stator core and wherein the first transport system includes a first pair of guide rails to enable movement of the first transport system in the first direction;
   a second transport system mounted to the carriage, wherein the second transport system enables movement of the carriage in a second direction relative to the slot, wherein the second direction is along the longitudinal axis; and
   a laser beam emitting head attached to the carriage wherein the laser beam emitting head moves within the slot in either the first or second directions or both the first and second directions and wherein the laser beam emitting head emits a laser beam that is reflected by a reflective surface that orients the laser beam away from the first direction and toward at least one sidewall to enable removal of coating between the top and bottom surfaces of the at least one sidewall.

9. The device according to claim 8 wherein the laser beam emitting head includes a mirror for directing the laser beam toward the coating.

10. The device according to claim 8 wherein the first transport system includes a first electric motor and a first drive screw for moving the carriage in the first direction.

11. The device according to claim 8 wherein the second transport system includes a second pair of guide rails oriented in the second direction.

12. The device according to claim 8 wherein the second transport system includes a second electric motor and a second drive screw for moving the carriage in the second direction.

13. The device according to claim 8 wherein the laser beam removes the coating by sublimation.

14. The device according to claim 8 wherein the second transport system includes mounting feet having flanges and the stator slot includes opposing walls each having a groove for accommodating the flanges to removably attach the device to the stator core.

15. The device according to claim 8 wherein the laser beam emitting head moves at a rate of approximately 18 inches per minute.

16. A method for removing a coating located on a slot of a stator core of an electric generator wherein the slot includes a bottom surface and first and second sidewalls that extend from the bottom surface and wherein the first and second sidewalls each terminate at a respective top surface, comprising the steps of:

moving a carriage along guide rails in a first direction relative to the slot, wherein the first direction is transverse to a longitudinal axis of the stator core;

moving the carriage in a second direction relative to the slot, wherein the second direction is along the longitudinal axis;

providing a laser beam emitting head on the carriage, wherein the laser beam emitting head includes a reflective surface;

moving the laser beam emitting head within the slot in either the first or second directions or both the first and second directions; and emitting a laser beam from the laser beam emitting head wherein the reflective surface orients the laser beam away from the first direction and toward at least one sidewall to enable removal of coating between the top and bottom surfaces of the at least one sidewall.

17. The method according to claim 16 wherein the laser beam emitting head includes a mirror for directing the laser beam toward the coating.

18. The method according to claim 16 wherein the laser beam removes the coating by sublimation.

\* \* \* \* \*